H. BURNS.
STARTING DEVICE FOR ENGINES.
APPLICATION FILED OCT. 7, 1910.

993,956.

Patented May 30, 1911.

3 SHEETS—SHEET 1.

Witnesses
Edwin F. McKee

Inventor
Harvey Burns
By Victor J. Evans
Attorney

H. BURNS.
STARTING DEVICE FOR ENGINES.
APPLICATION FILED OCT. 7, 1910.
993,956.
Patented May 30, 1911.
3 SHEETS—SHEET 2.
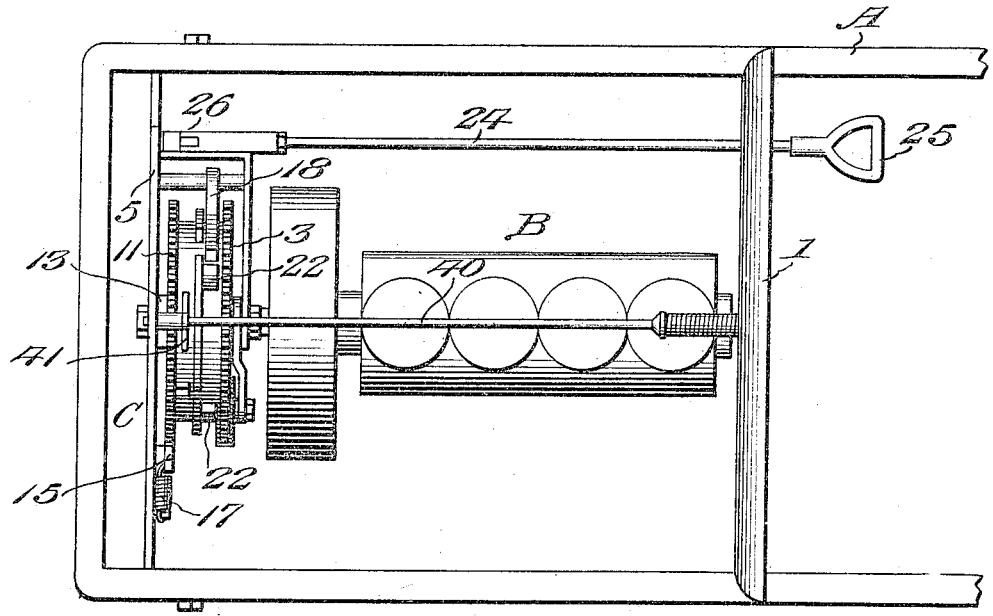
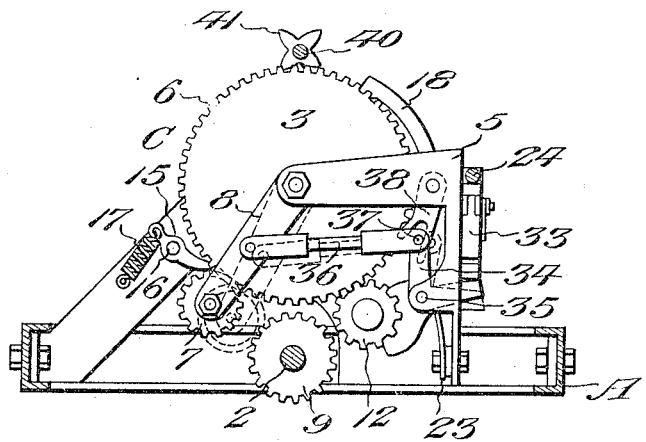
Witnesses
Edwin G. McKee
Inventor
Harvey Burns
By Victor J. Evans
Attorney

H. BURNS.
STARTING DEVICE FOR ENGINES.
APPLICATION FILED OCT. 7, 1910.

993,956.

Patented May 30, 1911.

3 SHEETS—SHEET 3.

Witnesses
Edwin F. McKee

Inventor
Harvey Burns
By Victor J. Evans
Attorney

UNITED STATES PATENT OFFICE.

HARVEY BURNS, OF LEBANON, OHIO.

STARTING DEVICE FOR ENGINES.

993,956.

Specification of Letters Patent. Patented May 30, 1911.

Application filed October 7, 1910. Serial No. 585,851.

*To all whom it may concern:*

Be it known that I, HARVEY BURNS, a citizen of the United States, residing at Lebanon, in the county of Warren and State of Ohio, have invented new and useful Improvements in Starting Devices for Engines, of which the following is a specification.

This invention relates to a device adapted for use in connection with automobiles driven by explosive engines, whereby the driver or chauffeur can start the engine without dismounting and turning the engine shaft in the usual manner.

The invention has for one of its objects to provide an extremely simple and practical mechanism of this character, which is reliable and efficient in use, composed of comparatively few parts and readily controlled.

Another object of the invention is the provision of a starting device of that type including a coil spring which can be wound when the engine is operating so as to be in readiness to again crank the engine whenever the same is stopped, there being novel means for operatively connecting the spring with the shaft for rotating the latter in starting the engine and for being wound by the shaft after the engine is started.

Another object of the invention is the provision of a novel indicating device, whereby the driver will be aware of the fact that the spring is wound so that he can disconnect it from the engine shaft.

With these objects in view and others, as will appear as the description proceeds, the invention comprises the various novel features of construction and arrangement of parts which will be more fully described hereinafter and set forth with particularity in the claims appended hereto.

Figure 1:
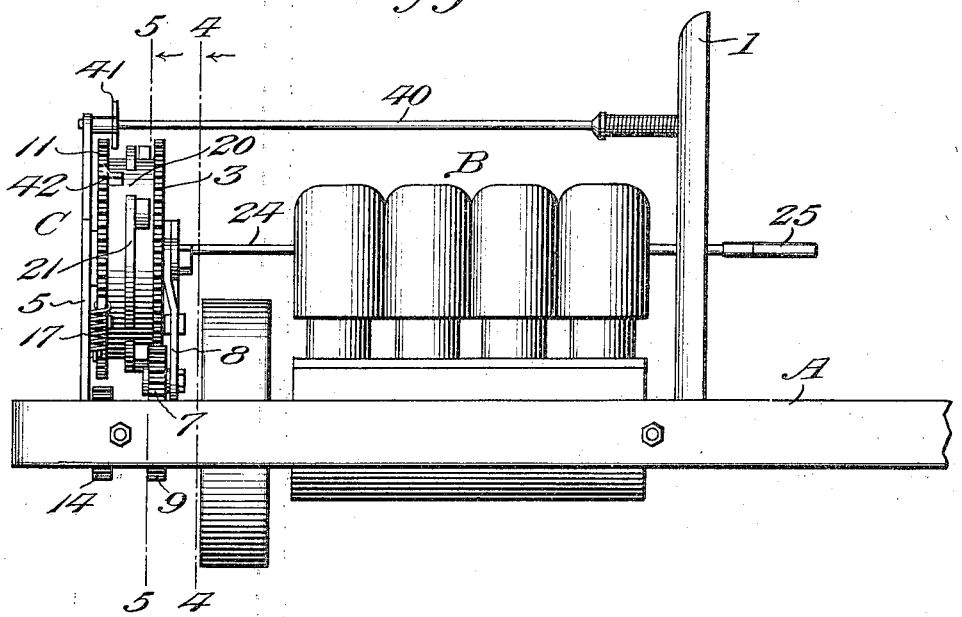
Figure 2:
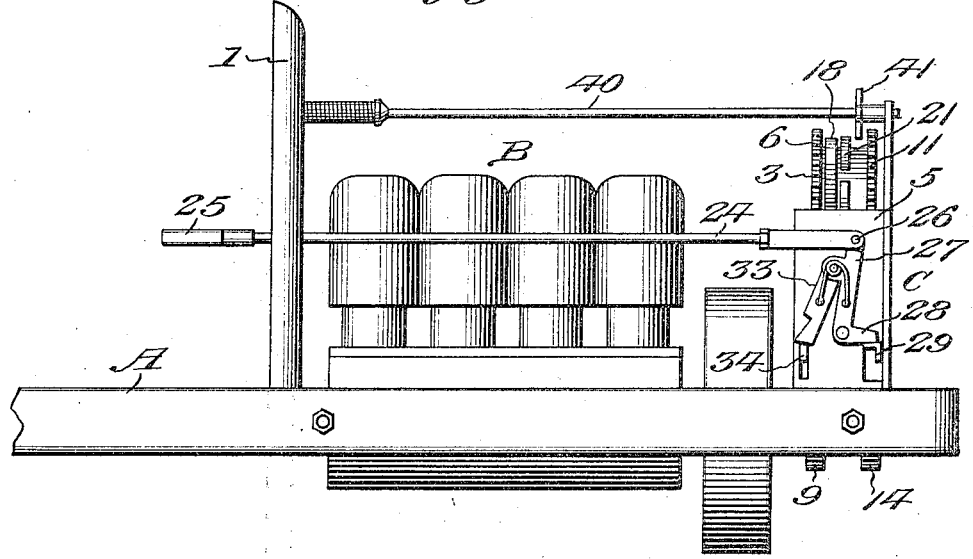
Figure 5:
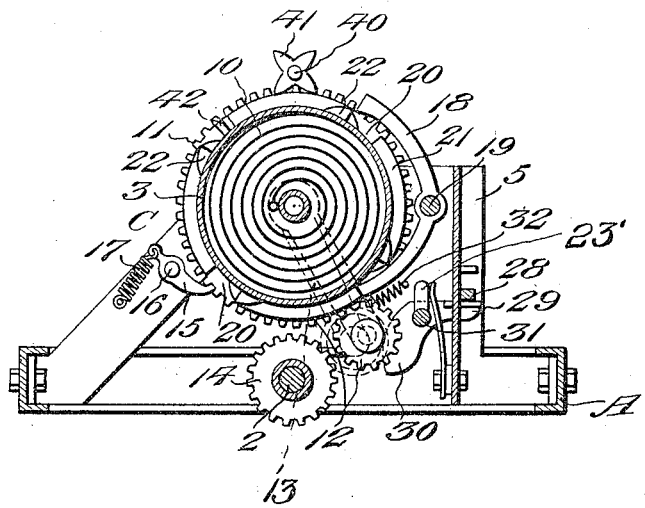
Figure 6:
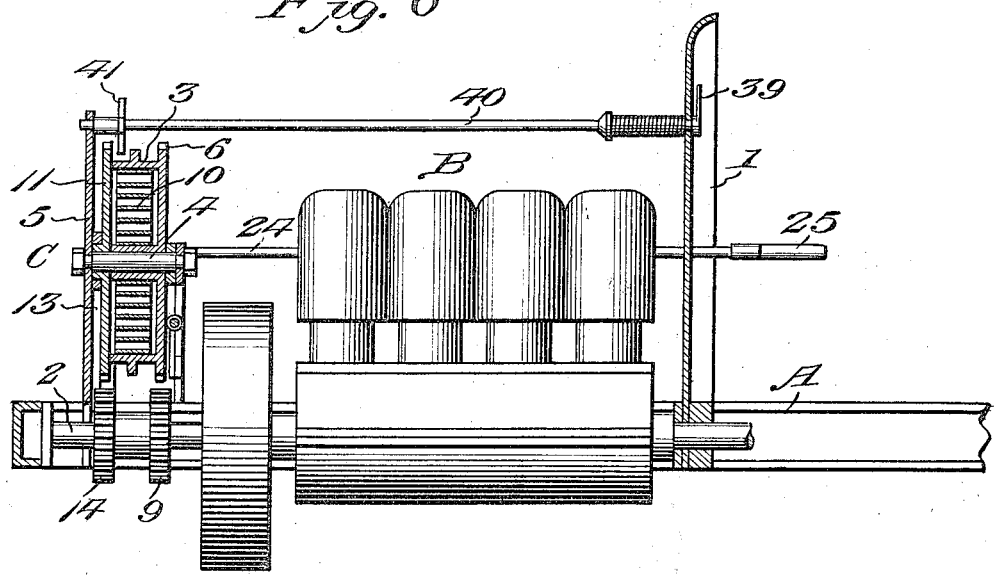

In the accompanying drawings, which illustrate one embodiment of the invention, Figures 1 and 2 are elevations of opposite sides of the front portion of an automobile with the hood removed to show the engine starting device applied thereto. Fig. 3 is a plan view with the hood removed. Fig. 4 is a vertical transverse section on line 4—4 of Fig. 1, showing the operating parts in normal position by full lines and in operating position for starting the engine by dotted lines. Fig. 5 is a vertical transverse section on line 5—5 with the parts shown in normal position by full lines and in position for winding the spring in dotted lines. Fig. 6 is a vertical section taken through the drum of the starting device.

Similar reference characters are employed to designate corresponding parts throughout the several views.

Referring to the drawings A designates the frame of an automobile on which is mounted at the front a propelling engine B, the same being covered by a hood, not shown, and at a suitable point, preferably in front of the engine, is the starting device C, which is controlled from a point behind the dash board 1 of the automobile so that it is unnecessary for the chauffeur or driver to dismount. The crank shaft 2 of the engine is adapted to be operatively connected with the device C for the double purpose of starting the engine by the latter and for rewinding or reënergizing the starting device by the engine after it has been started.

The starting device comprises a rotary drum 3, which is mounted on a fixed axle 4 carried by a transverse frame 5 secured to the main frame of the vehicle, the drum being located above the shaft 2 of the engine. This drum has peripheral teeth 6 with which meshes an idler pinion 7 carried on the lower end of an arm 8, which swings on the axle 4 as a center. On the shaft 2 is a starting gear 9 into mesh with which the pinion is adapted to be thrown whenever it is desired to start the engine, the pinion, of course, being permanently in mesh with the peripheral teeth 6. Arranged within the drum is a coil spring 10, which has one end fastened to the drum so as to rotate the same for starting the engine.

The spring 10 is wound by the end thereof opposite from that connected with the drum, being connected with a winding gear wheel 11, which is mounted on the axle 4. This gear wheel meshes with an idler pinion 12 that is carried on the lower end of an arm 13 which swings on the axle 4 as a center and the pinion is adapted to be thrown into mesh with a gear 14 fastened to the crank shaft of the engine, so that while the engine is running power can be imparted to the winding gear 11 for winding the spring 10 so that it will be energized for starting the engine again after it has been stopped. The spring is held under tension by means of a pawl 15 pivoted at 16 on the frame 5, the pawl being held by a spring 17 in engagement with the teeth of the gear wheel 11. This pawl permits said gear wheel 11 to turn in but one direction and holds the gear wheel stationary when the drum is released at the time it is desired to start the engine. The drum is prevented from turning with the gear wheel 11 during the winding of the spring by an escapement pawl 18, which is fulcrumed at 19 on the frame 5, the lower end of the pawl being adapted to engage in recesses 20 in a peripheral flange 21 surrounding the drum and when this pawl is released the drum will turn under the tension of the starting spring. Arranged on the periphery of the drum are teeth 22 that are adapted to be engaged by the upper end of the escapement pawl and these teeth are so arranged that they will engage the upper end of the pawl 18 and cause the lower end to enter the adjacent recess 20 in the flange 21 at the proper moment.

A single controlling device is provided for permitting the driver to simultaneously gear the drum 3 to the engine shaft and release the escapement pawl from the drum and also for gearing the engine shaft with the winding gear 11 when it is desired to rewind the coil spring. This controlling device comprises in the present instance a rod 24, which passes from the starting device C rearwardly through the dash board 1 where its rear end terminates in a handle 25. The front end of the rod is hingedly connected at 26 to the upper arm 27 of a bell crank lever 28 and the other arm engages a lug 29 formed on a rocker or cam 30. This rocker or cam is pivoted at 31 on the frame 5 and is adapted to have a wiping engagement with the lower end of the arm 13 so as to throw the idler pinion 12 on such arm into engagement with the gear 14 on the engine shaft. This action takes place when the controller rod 24 is pressed inwardly. When the controller rod is released the idler pinion is disengaged from the gear 14 by the contraction of a spring 32 connected with the arm 23 that carries the idler pinion. Hingedly connected with the bell crank lever 28 is a depending member 33 that has its lower end engaged with the bell crank lever 34 fulcrumed at 35 on the frame 5, said lever 34 being connected by a rod 36 with the arm 8 that carries the idler pinion 7. When the controller rod is pulled rearwardly the member 33 presses the bell crank lever 34 so as to pull the arm 8 in a direction to cause the idler pinion 7 to mesh with the gear 9. At the same time this movement occurs the escapement pawl is tilted so as to release the drum and allow the spring to start the engine. This releasing of the escapement pawl is effected by a pin or projection 37 which forms the pivot or pintle between the lever 34 and rod 36, the said projection engaging in a slotted arm 38 connected with the escapement pawl. It will thus be seen that by pulling rearwardly on the controller rod the engine will be started and that by pushing forwardly on the controller rod after the engine has started the spring can be rewound.

In order to permit the spring to be disconnected from the crank shaft of the engine after the spring has been wound to a safe tension, an indicating device is provided. This consists of an arrow or hand 29 arranged at the dash board within plain sight of the driver, the said arrow being fastened to a shaft 40 which extends to the front of the automobile under the hood where it is provided with a star wheel 41, which is engaged by a single tooth 42 on the winding gear 11 so that in four revolutions of the winding gear the hand 39 will make a complete revolution and show that the spring is completely wound. At this moment the inward pressure on the handle 25 is released so that the rewinding gear 11 will be disconnected from the engine shaft.

On the shaft 31 is a lug 23' against which presses a leaf spring 23, and as the lever 34 is rigid on the shaft 31, the spring will normally hold the pinion 7 out of mesh with the gear 2.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what is claimed as new, is:—

1. In an engine starting device, the combination of an engine including a shaft, a spring-rotated gear wheel, a rotating rewinding element co-axial with the gear wheel, independently movable arms mounted to swing from the axis of the wheel and element, a pinion on one of the arms permanently meshing with the gear wheel, a gear on the shaft with which the pinion is adapted to be engaged, an idler on the other arm adapted to be moved into and out of engagement with the shaft to transmit motion from the latter to the element for re-winding the spring, and a common actuator movable in one direction for actuating one arm in starting the engine and movable in the opposite direction for actuating the other arm to rewind the starting spring after the engine is started.

2. The combination of an engine shaft, a gear wheel, a spring for turning the wheel, an arm pivoted at the axis of the wheel, a pinion on the arm permanently meshing with the wheel, a gear on the shaft with which the pinion is adapted to be engaged, a bell crank lever, a connection between the bell crank lever and arm for moving the same, a pawl for preventing the gear wheel from turning while the spring is tensioned, operating means between the lever and pawl for releasing the latter, and a controller operating through the bell crank lever to throw the pinion into engagement with the said gear and release the pawl.

3. The combination of an engine shaft, a gear wheel, a spring for turning the wheel, an arm pivoted at the axis of the wheel, a pinion on the arm permanently meshing with the wheel, a gear on the shaft with which the pinion is adapted to be engaged, a bell crank lever, a connection between the bell crank lever and arm for moving the same, a pawl for preventing the gear wheel from turning while the spring is tensioned, operating means between the lever and pawl for releasing the latter, a controller operating through the bell crank lever to throw the pinion into engagement with the said gear and release the pawl, and means actuated by the controller for re-winding the spring by the rotating engine shaft.

4. In an engine starting device, the combination of a supporting frame, an engine shaft, an axle on the frame, a drum on the axle having gear teeth, an arm on the axle, a pinion on the arm meshing with the gear teeth, a gear on the shaft with which the pinion is adapted to engage, pawl teeth on the drum, a pawl adapted to engage the teeth, a spring in the drum, a bell crank lever operatively connected with the arm for moving the same to engage the pinion with the gear, a device pivoted on the frame and arranged to engage the lever, a spring for opposing the movement of the lever, means for releasing the pawl by the tilting of the lever, and a controller connected with the said device for operating the same.

5. The combination of an engine, a spring actuated element, means for operatively connecting the element with the shaft of the engine for starting the latter, a gear for winding the spring of the element, an idler pinion permanently meshing with the gear, a gear on the shaft of the engine with which the pinion is thrown into and out of engagement, and a single controller movable in one direction for operatively connecting the element with the shaft of the engine and movable in the opposite direction for operatively connecting the winding gear with the engine shaft after the engine has started.

6. The combination of an engine shaft having gear teeth, a pair of toothed elements arranged on a common axis, a coiled spring between the elements and connected therewith, a pair of arms swinging from the axis of the elements, pinions on the arms meshing respectively with the teeth of the said elements, springs arranged to hold the arms with their pinions normally disengaged from the teeth of the shaft, a lock for preventing rotation of the starting element by the spring, and a device movable in one direction for simultaneously releasing the lock and operating one arm to connect the starting element with the engine shaft through the pinion of such arm engaging the gear teeth of the shaft and movable in the opposite direction for operating the other arm to engage the other element with the engine shaft for re-winding the spring.

7. The combination of an engine shaft having gear teeth, a toothed drum, a spring in the drum tending to rotate the same, a spring winding gear, a common axis for the drum and gear, swinging arms, pinions on the arms meshing respectively with the teeth of the drum and gear, teeth on the shaft with which the pinions are adapted to be engaged, a bell crank lever, a connection between the lever and one of the arms, a spring operating on the lever to hold the arm in a position with its pinion out of engagement with the teeth on the shaft, a rocker adapted to actuate the other arm, a spring for holding said other arm with its pinion normally out of engagement with the teeth of the shaft, a pawl for preventing turning of the drum, and a single controller movable in one direction for operating the arm to connect the drum with the engine shaft and simultaneously releasing the pawl, and movable in the opposite direction for moving the other arm to connect the engine shaft with the said gear to re-wind the spring.

8. The combination of an engine shaft having gear teeth, a toothed drum, a spring in the drum tending to rotate the same, a spring winding gear, a common axis for the drum and gear, swinging arms, pinions on the arms meshing respectively with the teeth of the drum and gear, teeth on the shaft with which the pinions are adapted to be engaged, a bell crank lever, a connection between the lever and one of the arms, a spring operating on the lever to hold the arm in a position with its pinion out of engagement with the teeth on the shaft, a rocker adapted to actuate the other arm, a spring for holding said other arm with its pinion normally out of engagement with the teeth on the shaft, a pawl for preventing turning of the drum, a single controller movable in one direction for operating the arm to connect the drum with the engine shaft, and simultaneously releasing the pawl, and movable in the opposite direction for moving the other arm to connect the engine shaft with the said gear to re-wind the spring, a pivoted device movable in one direction to actuate the rocker for effecting re-winding of the spring and movable in the opposite direction to tilt the bell crank lever for effecting the starting of the shaft by the drum, means for disengaging the pawl during the last-mentioned movement of the device, and an actuating rod connected with the device.

9. The combination of an engine including a shaft, separate gears on the shaft, a drum, a spring for turning the same, means for operatively connecting the drum with one of the gears, a gear wheel connected with the spring for winding the same, means for operatively connecting the gear wheel with the other gear on the shaft of the engine to receive power from the latter to rewind the spring, separate pawls for normally holding the drum and gear wheel against rotation when the spring is under tension, and a common controlling means for releasing the drum engaging pawl while the drum is being operatively connected with the shaft of the engine and also for operating the second means to rewind the spring after the drum has been disconnected from the shaft of the engine.

In testimony whereof I affix my signature in presence of two witnesses.

HARVEY BURNS.

Witnesses:
W. H. HUSTON,
FLETCHER HAWK.

---

Copies of this patent may be obtained for five cents each, by addressing the "Commissioner of Patents, Washington, D. C."